M. T. J. OCHS.
PNEUMATIC TIRE.
APPLICATION FILED MAY 4, 1909.
964,049.
Patented July 12, 1910.
2 SHEETS—SHEET 1.
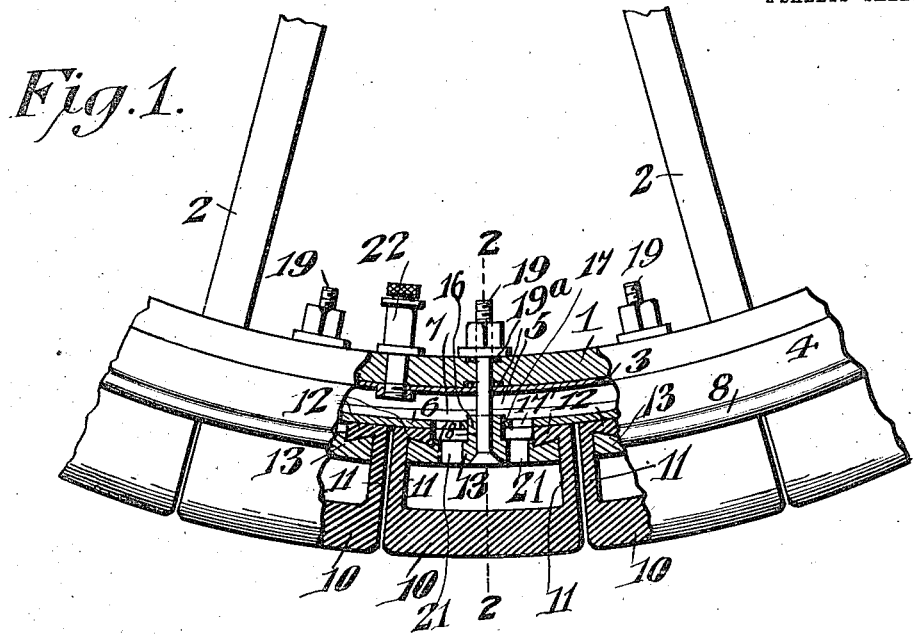
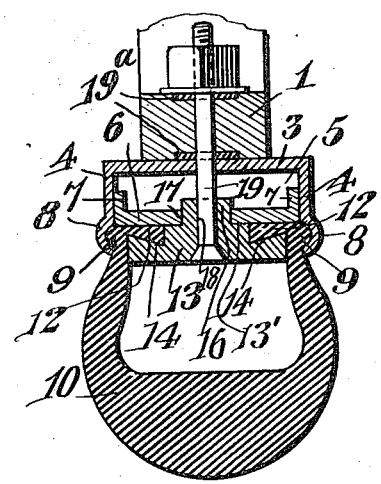
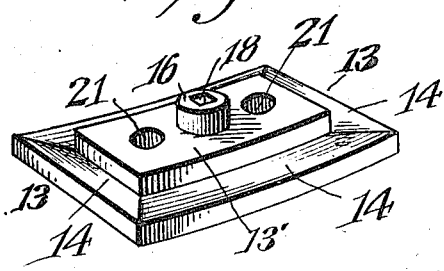
M. T. J. Ochs, Inventor
Witnesses
Jas. F. McCathran
C. Bradway.
By E. G. Siggers
Attorney M. T. J. OCHS.
PNEUMATIC TIRE.
APPLICATION FILED MAY 4, 1909.
964,049.
Patented July 12, 1910.
2 SHEETS—SHEET 2.
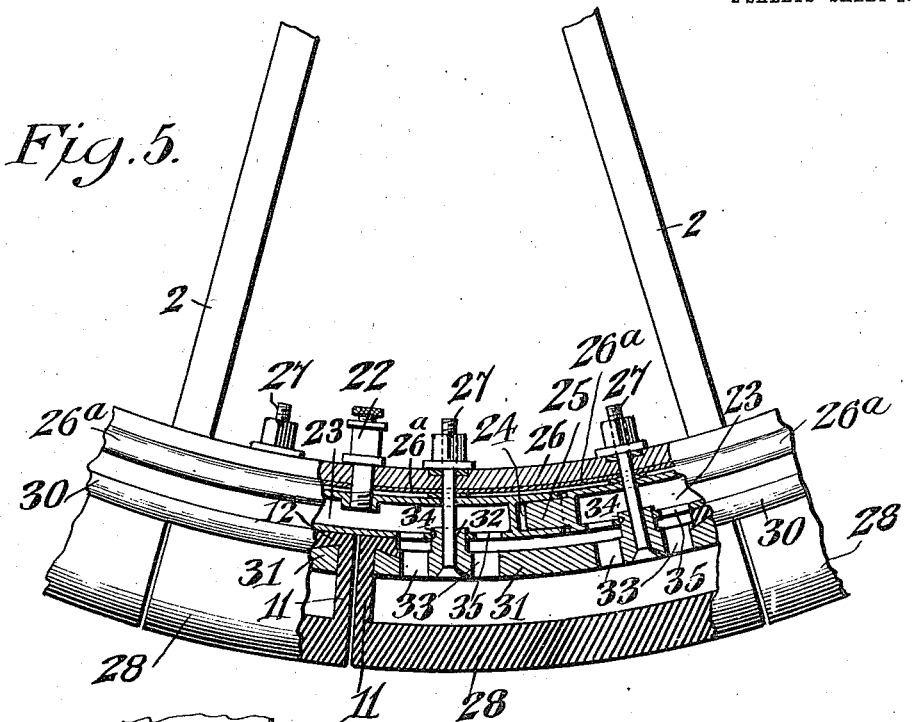
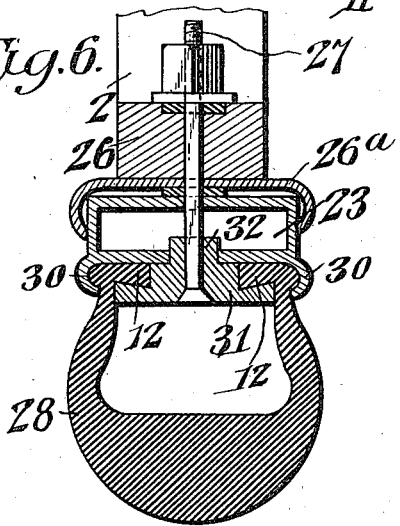
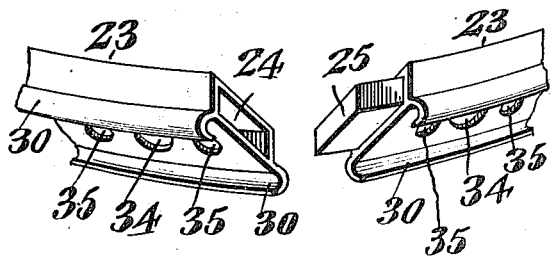
Witnesses
Jas. K. McCathran
C. Bradway.
M. T. J. Ochs, Inventor
By C. G. Siggers
Attorney

UNITED STATES PATENT OFFICE.

MILTON T. J. OCHS, OF ALLENTOWN, PENNSYLVANIA.

PNEUMATIC TIRE.

964,049.   Specification of Letters Patent.   Patented July 12, 1910.

Application filed May 4, 1909. Serial No. 493,837.

*To all whom it may concern:*

Be it known that I, MILTON T. J. OCHS, a citizen of the United States, residing at Allentown, in the county of Lehigh and State of Pennsylvania, have invented a new and useful Pneumatic Tire, of which the following is a specification.

This invention relates to pneumatic tires of that type composed of independent sections which intercommunicate through an annular air channel in the felly of the wheel.

The invention has for its principal object to provide a tire of this character which is of comparatively simple and inexpensive construction, reliable and efficient in use in minimizing the shocks transmitted to the vehicle and possessing good wearing qualities, in connection with a simple and effective means for attaching the sections to the felly in such a manner as to admit of ready repair in case of puncture.

With this and other objects in view, the invention comprises the various novel features of construction and arrangement of parts which will be more fully described hereinafter and set forth with particularity in the claims appended hereto.

In the accompanying drawing, which illustrates one embodiment of the invention, Figure 1 is a fragmentary side view of a wheel equipped with the tire, parts of the latter being shown in section. Fig. 2 is a transverse section on line 2—2, Fig. 1. Fig. 3 is a perspective view of one of the clamping plates for the tire sections. Fig. 4 is a fragmentary perspective view of the base portion of one of the tire sections. Fig. 5 is a modified form of tire. Fig. 6 is a transverse section thereof. Fig. 7 is a perspective view of the interlocking end of the air tube.

Similar reference characters are employed to designate corresponding parts throughout the views.

Referring to the drawing, 1 designates the wooden felly of the wheel to which the tire is secured, the felly being supported on spokes 2 in any approved manner. Surrounding the felly 1 is a tire-holding ring 3 which is formed with parallel side flanges 4 whereby an annular channel 5 is provided. Fitted in the chamber is a ring 6 having inwardly-extending flanges 7 bearing against the side flanges 4, whereby an air-containing chamber is provided around the wheel. The flanges 4 project beyond the outer ring section 6 and are formed with marginal beads 8 having undercut inner faces to provide shoulders into engagement with which marginal portions 9 on the tire sections 10 are compressed. The tire sections 10 are in the form of hollow blocks of rubber or other resilient material closed at the ends by walls 11 and open at their bases. These tire sections, which are arranged end to end and extend entirely around the wheel, have inwardly-extending base webs 12 at all sides and bearing against the outer surface of the ring 6. These webs 12 afford means for securing the tire sections in place by approximately rectangular clamping plates 13 which are substantially coextensive with the area of the chamber of each tire section, and they bear on the webs 12 to clamp the same against the ring 6. The inner face of plate 13 is cut away at its edges so as to provide a raised central portion 13' and a marginal flange 14 which has its inner face inclined so that the flange will bite into and thus obtain a better grip on the base web of the tire section. Each plate thus has two portions which bear respectively against the outer face or wall of the ring or tube 6 and against the base web of the tire section. The clamping plate serves as a spreader for forcing the portions 9 of the tire sections into the seats 8 on the flanges 4 so as to assist in retaining the tire sections in place. Each clamping plate 13 has a central boss 16 which passes through a slot 17 in the ring 6, the boss having a non-circular opening 18 for receiving a correspondingly-shaped bolt 19 that passes through the inner ring section and felly of the wheel for clamping the tire sections to the wheel and to hold the parts of the tire together. Leakage around the bolts 19 is prevented by rubber or other gaskets 19ᵃ between the felly and air tube and between the felly and nuts of the bolts.

The flanges 4 and 7 of the rings 3 and 6 may be brazed or welded together to thereby prevent leakage of air from the channel 5. The chambers of the various tire sections are in open communication with the common channel 5 so that air can pass freely one to the other, and for this purpose, ports 21 are provided in the clamping plates 13, which ports communicate with the ports 17' of the ring 6. Air is supplied to the channel or air tube 5 by an ordinary valve device 22 to which a pump can be attached. With a tire constructed in this manner, it is extremely easy to repair any tire section, and it dispenses with the necessity of carrying extra tires for emergency purposes. Furthermore, a reliable and resilient tire is provided and one which possesses good wearing qualities. It is observed that the clamping plates are flat on their outer faces, so that in case it is necessary to run the vehicle with the tire deflated, there will be no dangerous wear on the tire sections, since the flat faces of the clamping plates prevent cutting.

In order to adapt the tire for wheels already in use, the air tube, instead of being made continuous, as would be the case in the original manufacture of the wheels, will be split at one point so that the tube can be enlarged or contracted to fit the rim 26ª of the wheel to which it is to be applied. Automobile wheels already in use are usually of standard size but they may vary slightly in their peripheral dimensions, so that the air tube will have to be designed for accommodating itself to such variations. For this purpose, the construction shown in Figs. 5 to 7 is provided, in which the air tube 23 is constructed of a single piece of tubular metal manufactured in any desired manner and having its ends interlocked in such a manner as to accommodate the tube to a wheel rim. For this purpose, one end of the tube is provided with a socket 24, while the other end is formed with a tongue 25 that slidably engages in the socket, the ends of the tube, of course, being closed to hold air. The air tube is applied to the rim 26ª of the wheel and held in place by the same bolts, 27, which hold the tire sections 28 in place. All that will be necessary in equipping a wheel with the improved tire is the making of the holes in the felly 26 and rim 26ª for receiving the bolts 27. The tire sections 28 may be of any desired length, and in order to effectively retain them in place on the air tube and engaged with the hollow beads or flanges 30 thereof, it will be necessary to provide two or more bolts 27 for each clamping plate 31, the clamping plate being of the same general construction as that shown in Fig. 3, except that more bolt-receiving bosses 32 and air ports 33 are provided. The bosses 32 engage in openings 34 in the outer peripheral face of the air tube. The air tube is provided with ports 35 which aline with the ports 33 so that free communication is afforded between the air tube and chambers of the tire sections.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. The combination of a wheel felly, a rim extending around the same and formed with a continuous channel, an air tube arranged in the channel and having ports in its outer wall, a plurality of tire sections disposed around the tube and bearing against the said ported wall, each tire section being open at its base, a ported clamping plate in each tire section having separate portions arranged to engage the base and outer wall of the tube, the ports of the clamping plates being arranged to register with the ports of the air tube, and fasteners for securing the tire sections and clamping plates to the air tube and the air tube within the rim on the felly.

2. The combination of a wheel felly, a rim extending around the same and formed with a continuous channel, an air tube seated in the channel and formed with a continuous channel, said air tube being in the form of a ring open at one point and having interlocked ends, means for securing the air tube within the channel of the rim, a plurality of tire sections arranged in the channel of the air tube and having free communication with the air space of the said tube, and means for securing the bases of the tire sections in the channel of the air tube.

3. The combination of a wheel felly, an air tube secured thereto and formed with outstanding flanges projecting from its outer wall to form an annular channel, there being ports and apertures in the bottom of the channel, air holding tire sections seated in the channel, clamping plates bearing against the bottom of the channel and having portions engaging the bases of the tire sections, there being ports in the plates arranged to register with the first-mentioned ports, bosses on the clamping plates engaging in the apertures in the bottom of the channel for preventing movement of the plates, and fastenings for securing the plates and air tube rigidly together with the bases of the tire sections clamped between them.

4. The combination of a wheel felly, an air tube extending around the felly, tire sections each having an open base and an internal flange extending around the opening of the base, a clamping plate within each tire section having its middle portion arranged flat against the outer face of the air tube and having a marginal portion engaging the internal flange to clamp the same against the outer surface of the air tube, and means for securing the clamping plates to the air tube.

5. The combination of a wheel felly, an annular air container surrounding the same and having ports and apertures in its periphery, outwardly-extending flanges on the container between said flanges and each section having an internal flange, a clamping plate in each tire section engaging the flange thereof and holding the same against the periphery of the air container, ports in the plates communicating with the ports of the air container, bosses on the plates engaging in the apertures of the container, and clamping bolts extending through the said bosses, container and felly for securing the parts together.

6. In a wheel, the combination of an annular air tube, a plurality of hollow tire sections independently connected with the air tube, ports in the outer face of the air tube, clamping plates within the tire sections, ports in the clamping plates registering with the ports of the air tube, and fastenings passing through the clamping plates and air tube for clamping the tire sections to the latter.

7. In a wheel, the combination of an annular air tube, a plurality of hollow tire sections independently connected with the air tube, ports in the outer face of the air tube, clamping plates within the tire sections, ports in the clamping plates registering with the ports of the air tube, fastenings passing through the clamping plates and air tube for clamping the tire sections to the latter, and outstanding spaced flanges on the air tube for engaging opposite sides of the tire sections.

8. The combination of a wheel having a rim, an annular air tube extending around the rim and having its ends interlocked with each other, ports in the air tube, individual tire sections communicating with the tube through the said ports, clamping devices in the tire sections, and bolts passing through the said devices, air tube and rim for securing the parts in place.

9. The combination of a wheel having a channeled rim, an annular air tube extending around and disposed in the channel of the rim and having its ends interlocked with each other, ports in the air tube, individual tire sections communicating with the tube through the said ports, clamping devices in the tire sections, bolts passing through the said devices, air tube and rim for securing the parts in place, and spaced marginal flanges extending around the air tube for receiving the tire sections.

In testimony, that I claim the foregoing as my own, I have hereto affixed my signature in the presence of two witnesses.

MILTON T. J. OCHS.

Witnesses:
SAMUEL A. BUTZ,
EDWARD RUHE.